United States Patent [19]
McCann

[11] Patent Number: 4,609,230
[45] Date of Patent: Sep. 2, 1986

[54] DUAL BRAKE VALVES

[75] Inventor: Denis J. McCann, Powys, Wales

[73] Assignee: Lucas Industries public limited company, Birmingham, England

[21] Appl. No.: 675,730

[22] Filed: Nov. 28, 1984

[30] Foreign Application Priority Data

Dec. 3, 1983 [GB] United Kingdom ............... 8332323
Apr. 13, 1984 [GB] United Kingdom ............... 8409652

[51] Int. Cl.[4] ............................................. B60T 15/04
[52] U.S. Cl. .................................. 303/52; 303/40
[58] Field of Search ............... 303/6 R, 40, 52, 53, 303/54

[56] References Cited
U.S. PATENT DOCUMENTS 3,291,539 12/1966 Buelen ................................. 303/52
3,992,065 11/1976 Pekrul ............................... 303/52 X
4,010,983 3/1977 Coupland ......................... 303/52 X

FOREIGN PATENT DOCUMENTS 1052837 3/1959 Fed. Rep. of Germany ........ 303/52

Primary Examiner—Duane A. Reger
Attorney, Agent, or Firm—Sand & Hudak Co.

[57] ABSTRACT

A dual brake valve assembly including two co-axial primary and secondary valves for primary and secondary braking circuits is modified to include an auxiliary exhaust valve operable in conjunction with the pressure plate and a secondary piston for controlling operation of the secondary valve in response to operation of the primary valve. When the valve assembly is operated to apply the brakes, the auxiliary exhaust valve remains closed to prevent the premature release of fluid from the primary circuit irrespective of uncontrolled relative movement between parts of the valve assembly.

6 Claims, 4 Drawing Figures

DUAL BRAKE VALVES

This invention relates to a dual brake valve assembly for use in fluid pressure-operated vehicle braking systems embodying two independent braking circuits, the valve assembly being of the kind comprising a housing provided with sets of primary and secondary ports associated respectively with the two braking circuits and each consisting of a supply port for connection to a source of fluid under pressure and a delivery port for connection to a brake actuator, an exhaust, and two co-axial primary and secondary valves which are operative when actuated to isolate the delivery ports from the exhaust and connect them to the respective supply ports, and the valve assembly incorporates primary and secondary pistons for controlling operation of the primary and secondary co-axial valves respectively, operation of the primary piston being operative to control operation of the secondary piston, and operation of the primary piston being initiated by a pressure plate for receiving a brake-actuating force and which co-operates with the primary piston through resilient means.

Cabs of certain commercial vehicles have lightly damped suspension systems and the natural frequency of such suspensions is also low, typically 5 Hz. During certain modes of braking under the control of known valve assemblies of the kind set forth it is possible for the suspension system of the cab to be excited at or substantially close to its natural frequency. This can result in the suspension system of the cab going into a resonant state. The oscillations of the cab, in forward and backward directions, therefore increase in amplitude. This phenomenon is a most unpleasent experience for the driver and for any other person riding in the cab. Such oscillations continue until the vehicle comes to rest, or until the driver ceases to apply the brake.

In known dual valve assemblies of the kind set forth the secondary piston is provided with rigid oppositely directed annular projections which define seatings of the primary and secondary valves and with which a pair of valve heads are adapted respectively to co-operate to control communication between delivery ports and exhaust. During the initial stages of cab oscillations taking place there is a tendency for the secondary piston to move in its bore by a certain amount. This tends to cause fluid to be exhausted from the two circuits, thereby causing fluctuations in the pressures applied to the two circuits. I believe that this may be a cause of the cab going into the resonant state discussed above.

According to my invention in a dual valve assembly of the kind set forth the secondary piston is provided with rigid oppositely directed annular projections which define primary and secondary seatings of the primary and secondary valves and with which a pair of primary and secondary valve heads are adapted to co-operate to control communication between the respective delivery ports and the exhaust, and the valve assembly incorporates an auxiliary exhaust valve operable in conjunction with the pressure plate and the secondary piston to prevent the premature release of pressure fluid from the primary braking circuit which, in turn, acts through the secondary piston to control the braking pressure in the secondary braking circuit.

Conveniently the auxiliary exhaust valve comprises a valve member engageable with the seating of the primary valve substantially at the point at which the primary valve head engages with the primary seating to isolate the exhaust from the primary supply port, and the valve member is movable with respect to the pressure plate against a bias spring between an advanced position determined by the engagement of the valve member with a stop and a position spaced from the advanced position, in response to relative movement between the pressure plate and the secondary piston while still maintaining the valve member in engagement with the primary seating.

Thus the auxiliary valve remains closed to prevent the premature release of pressure fluid from the primary circuit, irrespective of relative movement between parts of the valve assembly, for example uncontrolled movement of the primary head with respect to the primary seating.

The valve member may be movably mounted on a stem depending from the pressure plate, and the bias spring acts to urge the valve member towards a shoulder on the stem which comprises the stop.

The valve member may be provided with a series of radial ports or a series of angularly spaced notches in its periphery, to provide a restricted leak path through the auxiliary exhaust valve when it is in its closed position.

The clearance between the valve member and a seating on the secondary piston may be adjusted to set the clearance at a value which will provide a satisfactory pressure release rate when the full brake release is required.

Two embodiments of our invention are illustrated in the accompanying drawings in which.

Figure 1:
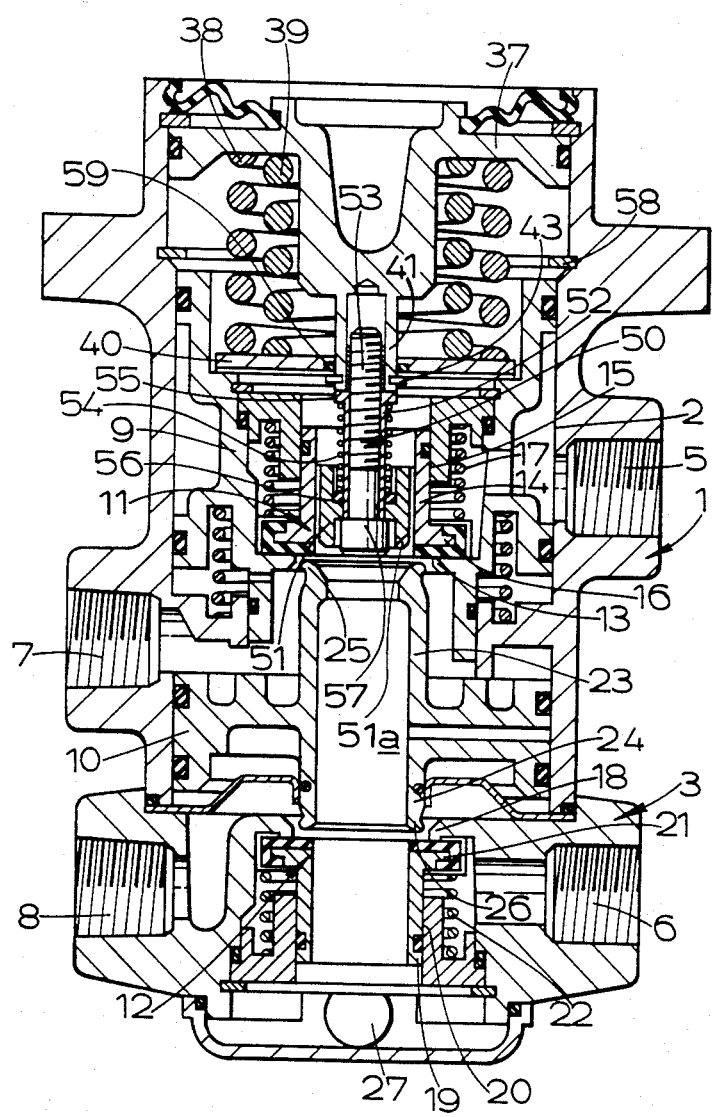
FIG. 1 is a longitudinal section through a dual brake valve assembly for use in an air pressure-operated vehicle braking system.

The dual brake valve illustrated in FIG. 1 of the drawings comprises a housing consisting of a first part 1 which is provided with longitudinally extending bore 2, and a second part 3 constituting a closure for one end of the bore 2.

The housing is provided with axially spaced primary and secondary supply ports 5 and 6 connected to different sources or to a common source of pneumatic pressure, and with complementary primary and secondary delivery ports 7 and 8 connected to the actuators of different or common brakes to form different braking circuits.

Primary and secondary pistons 9 and 10 work in the bore 2.

A primary valve 11 is carried by the primary piston 9 and a secondary valve 12 is housed in the housing part 3.

As illustrated the primary valve 11 comprises a radial seating 13 on the primary piston 9, between the supply port 5 and the delivery port 7, a cylindrical component 14 working in a bore 15 in the primary piston 9 and carrying at its inner end a radial flange constituting a head 16 for engagement with the seating 13, and a compression spring 17 for urging the head 16 into engagement with the seating 13 to isolate the supply port 5 from the delivery port 7.

The secondary valve 12 comprises a radial seating 18 disposed in the housing part 3, between the supply port 6 and the delivery port 8, a cylindrical component 19 working in a bore 20 in the housing part 3 and carrying at its inner end a radial flange constituting a head 21 for engagement with the seating 18, and a compression spring 22 for urging the head 21 into engagement with the seating 18, in a direction opposite the direction in which the head 16 is urged by the spring 17, to isolate the supply port 6 from the port 8.

The secondary piston 10 is provided with oppositely extending hollow annular extensions 23, 24 which are provided at their free ends with radial valve seats 25 and 26, and the seats 25 and 26 are normally spaced respectively from the heads 16 and 21 to place the delivery ports 7 and 8 in communication with an exhaust port 27 in the base of the housing part 3. Both extensions 23 and 24 are integral parts of the piston 10 itself.

A pressure plate 37 for receiving a brake actuating force is guided to slide in a portion of the bore 2 which is remote from the secondary piston 10, and the pressure plate 37 acts on the primary piston 9 through a pair of concentric graduating springs 38 and 39, and a thrust member 40. The pressure plate 37 has an integral, axial, stem 41 which projects through an opening in the thrust member 40 and works through a seal 59 surrounding the opening. The stem 41 carries a circlip 43 which abuts against the face of the thrust member 40 which is remote from the pressure plate 37, in order to cage the springs 38 and 39 and define a retracted position for the pressure plate 37, and the pressure plate 37 is movable inwardly through a distance limited by engagement with a radial stop ring 58.

The dual valve incorporates an auxiliary exhaust valve 50. As illustrated, the exhaust valve 50 comprises a tubular valve member 51 which is carried by the pressure plate 37 and is adapted to engage with the seat 25. The valve member 51 is guided to slide on a sleeve 52 which increases the effective length of the stem 41 and the sleeve 52 is clamped against the pressure plate 37 by a bolt 53, in the form of a socket cap screw, which is screwed into a tapped opening in the stem 41. A compression spring 54 acts between a radial flange 55 on the sleeve 52 and a seal 56 on the valve member 51 which seals against the sleeve 52, normally to urge the valve member 51 into an advanced position in which it engages with a stop defined by the head 57 of the bolt.

In the inoperative position shown in the drawings, the supply ports 5 and 6 are isolated from the corresponding delivery ports 7 and 8 and the delivery ports 7 and 8 are in communication with the exhaust port 27 through the hollow piston 10. The valve member 51 is spaced from the seat 25.

When the pressure plate 37 is depressed, for example by foot pressure, that force is transmitted to the primary piston 9 through the graduated springs 38 and 39, and the thrust member 40. The pressure plate 37 and the piston 9 both move inwardly with the pressure plate 37 moving through a greater relative distance than the piston 9. This causes the valve member 51 and the head 16 to engage with the seating 25 both at substantially the same point to isolate the delivery port 7 from the exhaust port 27, and any subsequent relative movement between the pressure plate 37 and the piston 9 is accommodated by movement of stem 41 relative to the valve head 51 against the loading in the spring 54. The applied force is then transmitted through the extension 23 to urge the secondary piston 10 downwardly until the seating 26 engages with the head 21 to isolate the delivery port 8 from the exhaust port 27. Further displacement of the primary piston 9 then causes the two valve heads 16 and 21 to move relatively away from the seatings 13 and 18 simultaneously against the force in the springs 17 and 22 so that the supply and delivery ports 5, 7 and 6, 8 are placed in communication with each other through respective communicating passages. Theoretically this gives substantially no pressure differential.

When the pressure acting over the area of the primary piston 9 is sufficient to subject the piston 9 to a force equal and opposite to the force applied by the thrust member 40, the valve assembly assumes a lapped condition in which each head 16 and 21 is in engagement with both respective seatings 13, 26 and 18, 25, to isolate the delivery and supply ports from each other and from the exhaust 27.

In this condition the pressures at the primary and secondary delivery ports 7 and 8 are equal as the primary delivery pressure acts on opposite ends of the secondary piston 10. As the force applied to the pressure plate 37 increases to the point at which the plate 37 abuts against the stop ring 58 and the springs 17 and 22 are compressed to a maximum extent, the head 51 remains in contact with the seating 25 and the head 57 of the bolt 53 and the sleeve 52 slide relatively into the hollow extension 23 with the spring 54 being compressed by an equivalent amount.

When the foot pressure applied to the plate 37 is relieved, the plate moves back towards its rest position and the primary piston 9 is permitted to move back in the same direction, the seats 25 separating from the head 16 and the valve member 51, and the seat 26 separating from the head 21. This places the delivery ports 7 and 8 in communication with the exhaust port 27 to allow pressure to decay from the primary and secondary circuits.

The position of the piston 10 in its bore when the brake is applied is determined by the pressure in the primary braking circuit which acts on the upper face of the piston 10, in turn to determine the operation of the secondary braking circuit. Thus relative accidental movement between the head 16 and the seat 25, for example due to cab suspension movement, will not place the port 7 in communication with the exhaust port 27, since the valve member 51 will remain in engagement with the seat 25, at least while foot pressure is applied to the pressure plate 37.

The peripheral edge of the valve member 51 where it engages with the seat 25 is provided with a plurality, for example three, angularly spaced notches 51a to provide a restricted leak path through the auxiliary exhaust valve 50 when it is in its closed position. This enables the pressure on the primary circuit to be reduced slightly, but at a controlled rate, upon relative movement between the piston 10 and the head 16.

In this modified construction when the foot pressure applied to the plate 37 is relieved and, after a small amount of movement, the seats 25 and 26 separate from their heads 16 and 21 respectively, air from the primary delivery port 7 cannot excape freely to atmosphere through the secondary piston 10 since the head 51 is still in engagement with the seating 25, and discharge can take place only through the notches in the peripheral edge of the head 51. This slow discharge of air from the primary side of the piston 10 is reflected in the release of pressure from the secondary discharge port 8 by an equivalent extent due to the relative position of the piston 10.

This aspect occurs only during partial pressure release since full brake release will cause the plate 37 to return fully to its rest position and the head 51 will separate from the seating 25, allowing unrestricted flow from to the exhaust port 27 from the delivery ports 7 and 8 as described above.

Figure 2:
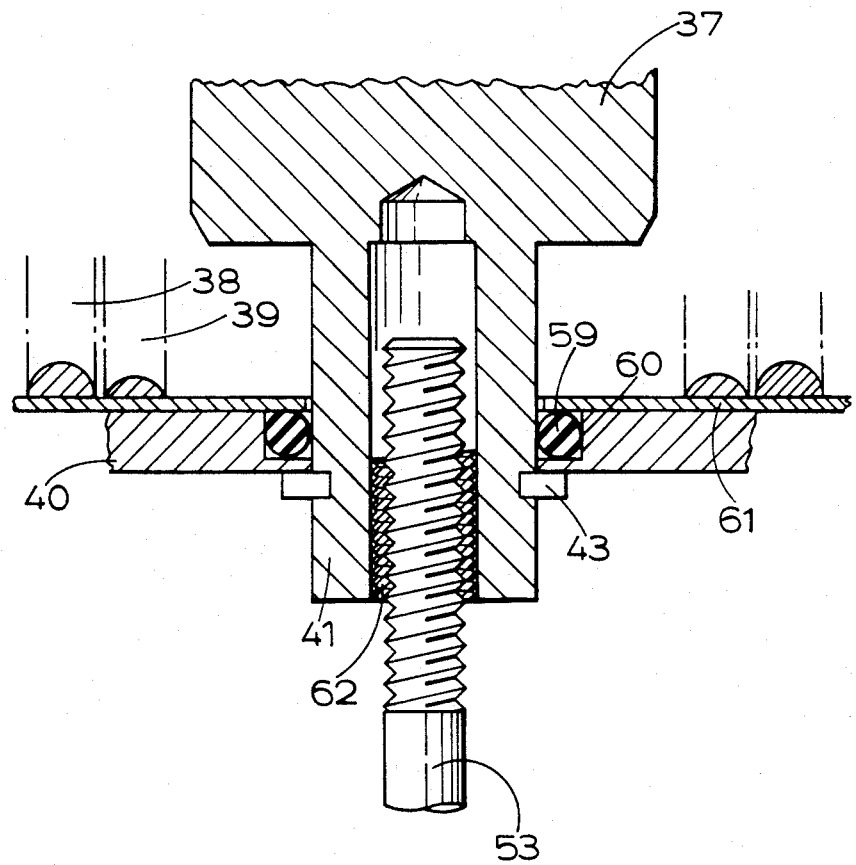
FIG. 2 is a portion of the valve assembly on an enlarged scale showing a modification.

In the modified construction illustrated in FIG. 2, the seal 59 is received in a radial groove 60 in the thrust member 40, and a seal retaining washer 61 is interposed between the thrust member 40 and the springs 38, 39 to retain the seal 50 in the groove 60.

The bolt 53 is screwed into a threaded insert 62 of the self-locking type housed within the stem 41.

Figure 3:
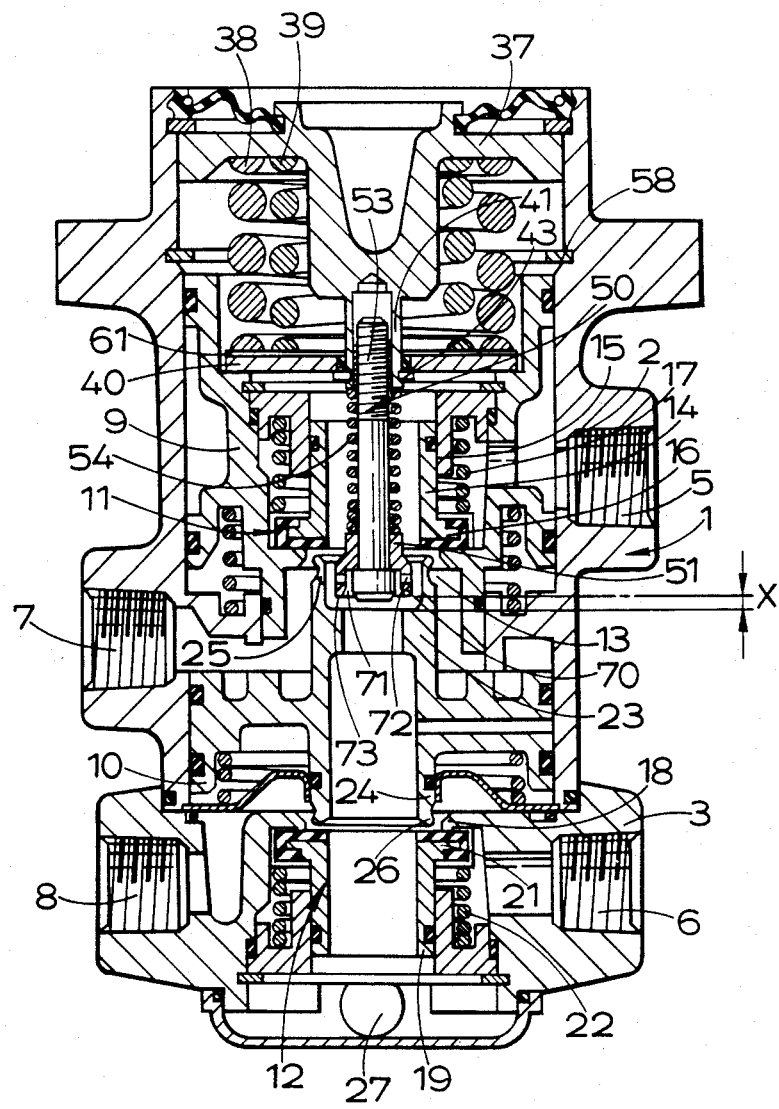
FIG. 3 is a section similar to FIG. 1, through a modified dual brake valve assembly.

In the dual valve assembly illustrated in FIG. 3 of the drawings, the sleeve 52 and the seal 56 are omitted, and the valve member 51 is slidably guided on the bolt 53. The valve member 51 has a skirt 70 and from which it is spaced to define an annular passage 71, and radial ports 72 in the skirt 70 provide a flow path between opposite sides of the valve member 51 when a planar face 73 of the free end of the skirt 70 is in engagement with the seat 25 which is of complementary planar outline.

Figure 4:
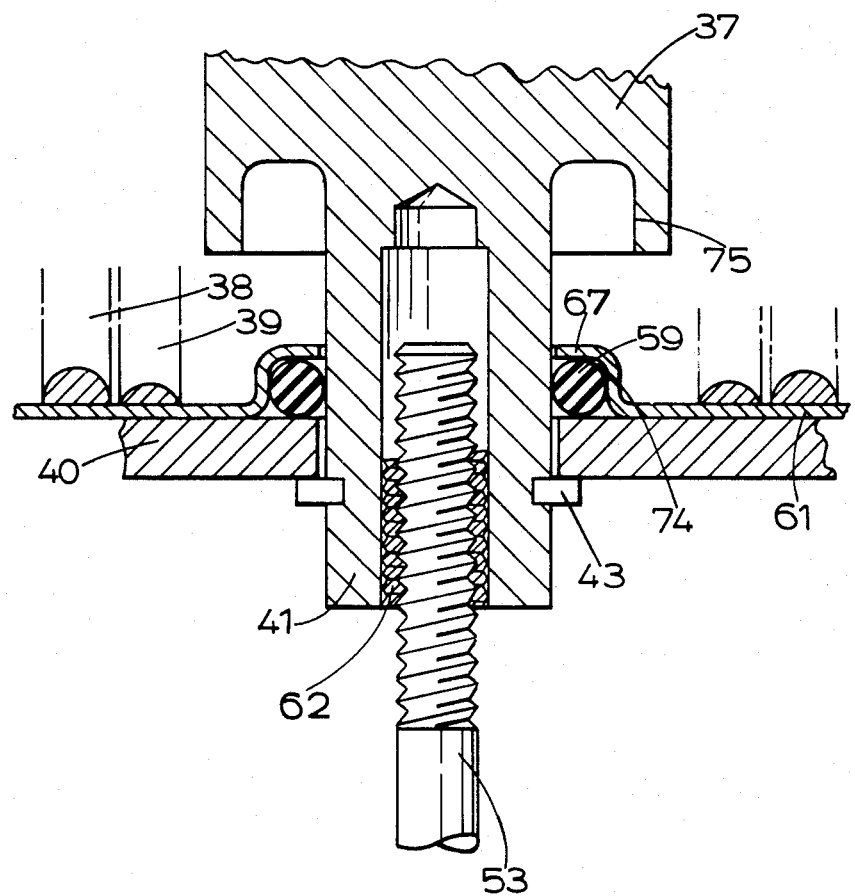
FIG. 4 is a portion of the valve assembly of FIG. 3 on an enlarged scale showing a modification.

In the modification shown in FIG. 4, the seal 59 is retained within a recess 74 defined between a radial flange 67 pressed from the seal retaining washer 61 and the adjacent, planar, face of the thrust member 40. The inner end of the pressure plate 37 is provided with a recess 75 to accommodate the flange 67, with clearance, when the pressure plate 37 approaches the extent of its travel towards the stop 58.

The radial ports 72 function in a similar manner to the angularly spaced notches in the modification of the embodiment of FIG. 1 described above.

Since slow pressure release or discharge of air through the radial ports 72 is only present during partial brake releases as described above, and a full brake release causes the pressure plate 37 to return to its retracted position, the rate at which pressure is released from the primary side of the piston 10, and hence the secondary side, is regulated by clearance 'X' between the face 73 and the seat 25.

Omitting the sleeve 52 enables us to adjust the clearance 'X' by screwing the bolt 53 into or out of the threaded insert 62, until the clearance is set at a value which will achieve a satisfactory pressure release rate.

Regulation of the pressure release rate has been found to aid the inhibition of cab oscillations when the brake delivery pressure is low and oscillation can move the valve 51 clear of the seat 25.

The construction and operation of the dual valve assembly illustrated in FIGS. 3 and 4 is otherwise the same as that of FIG. 1 and corresponding reference numerals have been applied to corresponding parts.

I claim:

1. A dual brake valve assembly for use in fluid pressure-operated vehicle braking systems embodying two independent braking circuits, said valve assembly comprising a housing provided with a bore and with sets of primary and secondary ports associated respectively with the two braking circuits and each said set consisting of a supply port for connection to a source of fluid under pressure and a delivery port for connection to a brake actuator, an exhaust, and two co-axial primary and secondary valves which are operative when actuated to isolate said delivery ports from the exhaust and connect said delivery ports to said respective supply ports, said primary valve comprising a primary valve seating, and a primary valve head for engagement with said primary valve seating, and said secondary valve comprising a secondary valve seating, and a secondary valve head for engagement with said secondary valve seating, and the valve assembly incorporates a primary piston working in said bore for controlling operation of said primary valve, a secondary piston also working in said bore for controlling operation of said secondary valve, operation of said primary piston being operative to control operation of said secondary piston, a pressure plate for receiving a brake-actuating force to operate said primary valve, and resilient means through which said pressure plate acts on said primary piston to operate said primary valve, wherein said secondary piston is provided with rigid oppositely directed annular projections which define said primary and secondary seatings of said primary and secondary valves and with which said primary and secondary valve heads are adapted to co-operate to control communication between the said respective delivery ports and said exhaust, and said valve assembly incorporates an auxiliary exhaust valve comprising valve means operable in conjunction with said pressure plate and co-operating with said secondary piston to prevent premature release of pressure fluid from said primary braking circuit which, in turn, acts through said secondary piston to control the braking pressure in said secondary braking circuit.

2. A dual valve assembly as claimed in claim 1, wherein said auxiliary exhaust valve comprises a valve member engageable in a closed position with said seating of said primary valve substantially at the point at which said primary valve head engages with said primary seating to isolate said exhaust from said primary supply port, and a stop for said valve member, and a bias spring against which said valve member is movable with respect to said pressure plate between an advanced position determined by the engagement of said valve member with said stop and a position spaced from said advanced position, in response to relative movement between said pressure plate and said secondary piston while still maintaining said valve member in engagement with said primary seating.

3. A dual assembly as claimed in claim 2, wherein said valve member is movably mounted on a stem depending from said pressure plate and having a shoulder, and said bias spring acts to urge said valve member towards said shoulder on said stem which comprises said stop.

4. A dual valve assembly as claimed in claim 2, wherein said valve member of said auxiliary valve has a periphery in which is provided a series of angularly spaced notches which provide a restricted leak path through said auxiliary exhaust valve when it is in said closed position.

5. A dual valve assembly as claimed in claim 2, wherein said valve member of said auxiliary valve is provided within a series of radial ports which provide a restricted leak path through said auxiliary exhaust valve when it is in said closed position.

6. A dual valve assembly as claimed in claim 2, wherein a clearance between said valve member of said auxiliary valve and a seating on said secondary piston is adjusted to set said clearance at a value which will provide a satisfactory pressure release rate when the full brake release is required.

* * * * *